US012620918B2

(12) United States Patent (10) Patent No.: US 12,620,918 B2
Bueno Mariani et al. (45) Date of Patent: May 5, 2026

(54) METHOD AND DEVICE FOR CONTROLLING THREE-PHASE MOTOR

(71) Applicant: Mitsubishi Electric Corporation, Tokyo (JP)

(72) Inventors: Guilherme Bueno Mariani, Rennes Cedex (FR); Nicolas Voyer, Rennes Cedex (FR); Gianmario Pellegrino, Turin (IT); Anantaram Varatharajan, Turin (IT)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 242 days.

(21) Appl. No.: 18/574,370

(22) PCT Filed: Jun. 1, 2022

(86) PCT No.: PCT/JP2022/023030
§ 371 (c)(1),
(2) Date: Dec. 27, 2023

(87) PCT Pub. No.: WO2023/286498
PCT Pub. Date: Jan. 19, 2023

(65) Prior Publication Data
US 2024/0243678 A1 Jul. 18, 2024

(30) Foreign Application Priority Data
Jul. 13, 2021 (EP) .................................... 21305974

(51) Int. Cl.
| | |
|---|---|
| *H02P 21/13* | (2006.01) |
| *H02P 21/14* | (2016.01) |
| *H02P 21/18* | (2016.01) |
| *H02P 21/26* | (2016.01) |

(52) U.S. Cl.
CPC ............ *H02P 21/13* (2013.01); *H02P 21/141* (2013.01); *H02P 21/18* (2016.02); *H02P 21/26* (2016.02)

(58) Field of Classification Search
CPC .......... H02P 21/13; H02P 21/18; H02P 21/26; H02P 21/141
See application file for complete search history.

(56) References Cited

U.S. PATENT DOCUMENTS 11,239,772 B1 * 2/2022 Bojoi ...................... H02P 21/22

OTHER PUBLICATIONS

Varatharajan et al., "Direct Flux Vector Control of Synchronous Motor Drives: A Small-Signal Model for Optimal Reference Generation", IEEE Transactions on Power Electronics, vol. 36, No. 9, Sep. 2021, p. 10526-10535.

* cited by examiner

*Primary Examiner* — Said Bouziane
(74) *Attorney, Agent, or Firm* — Birch, Stewart, Kolasch & Birch, LLP

(57) ABSTRACT
A device and a method control a motor using a maximum torque per ampere field module and a direct flux vector control module. The method: determines by the direct flux vector control module reference voltages in a fτ framework; drives the motor with the summed voltages; measures a motor current vector; determines a high frequency injection voltage so that the high frequency current response of the motor to the high frequency injection voltages is perpendicular to the measured motor current vector; determines an estimated flux from the measured motor currents and the voltage references; and determines, from the estimated flux and the high frequency sinewave signal, the reference flux so that the high frequency flux response to the injected voltage is aligned with the measured current vector.

7 Claims, 5 Drawing Sheets

S800 — Division

S801 — DFVC

S802 — $\alpha\beta/f\tau$

S803 — Sum

S804 — VSI

S805 — $i_{abc}$

S806 — $abc/\alpha\beta$

S807 — $\alpha\beta/f\tau$

S808 — $j$-axis injection

S809 — Flux observer

S810 — MTPA tracking

METHOD AND DEVICE FOR CONTROLLING THREE-PHASE MOTOR

TECHNICAL FIELD

The present invention relates generally to a method and a device for controlling a three-phase motor.

BACKGROUND ART

Electrical machines are widely used on the industry either for factory automation or transportation. Many control techniques for machines as Permanent Magnet Synchronous Machines (PMSM), Synchronous Reluctance Machines (SyncRM), Wounded Rotor Synchronous Machines (WRSM) often use a rotary encoder for obtaining the speed and the position of the machine as feedback.

The demand for low-cost and robust motor drives has increased the development of sensorless control. Without those sensors the machine drives become less expensive and more robust to dusty and harsh environments.

Many techniques for sensorless control are proposed. These techniques are based on the estimation of the position and the speed of the machine but one aspect that is often neglected on the sensorless controller is the strategy for choosing the current references of the FOC (Field-Oriented Control) controller from a given desired torque reference. In CVC controllers (Current Vector Control), the reference quantities are the current levels in dq axis, in the rotor reference frame, which position has to be estimated. In DFVC (Direct Flux Vector Control), the reference quantities are the norm of flux and one current component. The latter technique is attracting, as it also applies to the stator flux reference frame, which needs no position estimate.

Best current trajectory is the MTPA (Maximum Torque per Ampere), which chooses the combination of references in order to maximise the torque for a given current level (and given copper losses). In the bibliography, different techniques to track the MTPA are proposed using one or more Lookup Tables (LUTs) or injection based. With lookup tables, the torque is measured as function of Idq current in order to derive the ideal MTPA trajectory. This trajectory can be stored and used dynamically with varying torque levels. However specific measurement is needed prior to operating MTPA mode. This is the most common way to track MTPA trajectory.

These methods have serious limitations. It is generally difficult for a General-Purpose Inverter (GPI) to establish a lookup table of MTPA for an unknown motor. The alternative to the direct measurement of the MTPA LUTs is the manipulation of the flux linkage or inductance map LUTs, which again requires dedicated tests or a self-commissioning session. For CVC controllers, MTPA expression requires the knowledge of incremental and chord inductances in both d and q axis. Generally, MTPA control tends to require the knowledge of inductance LUTs. Uncertainty in inductances results in position error and risk of instability and deviation from MTPA, which causes misuse of energy besides the possible loss of control.

Techniques for tracking the MTPA and MTPV for DFVC controller are proposed in the bibliography. However, they rely on measured inductances LUT, for the MTPA tracking.

Injection methods to track the MTPA online were already proposed in the bibliography, but they are commonly used for CVC controllers and not applicable for DFVC controllers.

SUMMARY OF INVENTION

The present invention aims to provide a sensorless control method and device using DFVC control technique and reaches MTPA optimal operation conditions without any prior information on the motor to be controlled.

To that end, the present invention concerns a method for controlling a motor using a maximum torque per ampere field module and a direct flux vector control module, characterized in that the method comprises the steps of:

determining by the direct flux vector control module reference voltages in a ft framework from an estimated flux $\hat{\lambda}$ norm, a reference flux $$\lambda^*_{MTPA},$$

a measured current motor vector $i_{f\tau}$ in in a ft framework using an estimated load angle $\hat{\delta}_s$ and a reference current $$i^*_\tau$$

in a $\tau$ axis that is obtained from a reference torque T* and the reference flux $$\lambda^*_{MTPA},$$

summing the reference voltages transformed in a $\alpha\beta$ stator framework $v^*_{\alpha\beta}$ with a high frequency injection voltage $v_{\alpha\beta_{inj}}$ driving the motor with the summed voltages, measuring a motor current vector $i_{\alpha\beta}$, determining the high frequency injection voltage $v_{\alpha\beta_{inj}}$ from the measured motor current vector $i_{\alpha\beta}$ and a high frequency sinewave signal $i_\delta$ sin($\omega_h$t), so that the high frequency current response of the motor to the high frequency injection voltage is perpendicular to the measured motor current vector, determining an estimated flux $\hat{\lambda}_{\alpha\beta}$ from the measured motor currents $i_{\alpha\beta}$ and the voltage references $v^*_{\alpha\beta}$, determining, by the maximum torque per ampere field module, from the estimated flux $\hat{\lambda}_{\alpha\beta}$ and the high frequency sinewave signal sin($\omega_h$t), the reference flux $$\lambda^*_{MTPA}$$

to be provided to the direct flux vector control module so that the high frequency flux response to the injected voltage is aligned with the measured motor current vector.

The present invention concerns also a device for controlling a motor using a maximum torque per ampere field module and a direct flux vector control module, characterized in that the device comprises:

means for determining by the direct flux vector control module reference voltages from an estimated flux $\hat{\lambda}$ norm, a reference flux $$\lambda^*_{MTPA},$$

a measured current motor vector $i_{f\tau}$ in a f$\tau$ framework using an estimated load angle $\hat{\delta}_s$ and a reference current $$i_\tau^*$$

in a $\tau$ axis that is obtained from a reference torque T* and the reference flux $$\lambda_{MTPA}^*,$$

means for summing the reference voltages transformed in a stator $\alpha\beta$ framework $v^*_{\alpha\beta}$ with a high frequency injection voltage $v_{\alpha\beta_{inj}}$, means for driving the motor with the summed voltages, means for measuring a motor current vector $i_{\alpha\beta}$, means for determining the high frequency injection voltage $v_{\alpha\beta_{inj}}$ from the measured motor current vector $i_{\alpha\beta}$ and a high frequency sinewave signal $i_\delta \sin(\omega_h t)$, so that the high frequency current response of the motor to the high frequency injection voltage is perpendicular to the measured motor current vector, means for determining an estimated flux $\hat{\lambda}_{\alpha\beta}$ from the measured motor currents $i_{\alpha\beta}$ and the voltage references $v^*_{\alpha\beta}$, means for determining, by the maximum torque per ampere field module, from the estimated flux $\hat{\lambda}_{\alpha\beta}$ and the high frequency sinewave signal $\sin(\omega_h t)$, the reference flux $$\lambda_{MTPA}^*$$

to be provided to the direct flux vector control module so that the high frequency flux response to the injected voltage is aligned with the measured motor current vector.

Thus, the motor is controlled on the MTPA trajectory without the need of any look-up-tables. LUT-less MTPA is applied to Direct Flux Vector control. The overall stability of sensorless control is improved, as the rotor position needs not be estimated, and because MTPA criterion is met in any saturation conditions.

According to a particular feature, the means for determining the high frequency injection voltage $v_{\alpha\beta_{inj}}$ comprises:

means for determining a fundamental current vector $i_{\alpha\beta\_LF}$, means for transforming the current vector $i_{\alpha\beta}$ measured in the stator framework $\alpha\beta$ into a current vector $i_{ij}$ in a current framework ij aligned with the determined fundamental current vector $i_{\alpha\beta\_LF}$, means for determining a filtered current vector $i_{ijHF}$ by high frequency filtering of the current vector ij, means for subtracting a high frequency sinewave signal $i_\delta \sin(\omega_h t)$ in the j axis of the current framework to the filtered current vector ijHF and for performing a proportional integral regulation in order to obtain a voltage injection signal in the current framework ij, means for transforming the voltage injection signal in the current framework ij into the high frequency voltage $v_{\alpha\beta_{inj}}$ in the stator framework $\alpha\beta$.

Thus, The HF (high frequency) injection voltage is set so as to drive the HF variation of current modulus to zero. The HF response of the machine to the HF injection voltage is then orthogonal to the measured fundamental current vector.

According to a particular feature, the maximum torque per ampere module comprises:

means for performing a heterodyne modulation of the estimated flux $\hat{\lambda}_j$ in a j axis and for performing a proportional integral regulation of the heterodyne demodulation result in order to provide the reference flux.

Thus, the HF content of estimated flux that is perpendicular to the current can get estimated. The proportional integral produces the reference flux which can drive this HF content to zero. In absence of HF variations of current amplitude, the resulting reference flux necessarily fulfils the MTPA criterion.

According to a particular feature, the direct flux vector control module comprises:

means for subtracting from the reference current $$i_\tau^*$$

in the $\tau$ axis, the measured current $i_\tau$ in the $\tau$ axis and performing a first proportional integral regulation of the result of the subtraction, means for subtracting from the reference flux $$\lambda_{MTPA}^*,$$

the estimated flux norm, and performing a second proportional integral regulation of the result of the subtraction, means for executing a first summing of the results of the proportional integral regulations, means for summing the result of the first summing by a first value that is dependent of a stator resistance of the motor, an estimated motor speed and the reference current in the t axis, means for executing a second summing of the result of the second proportional integral regulation to a second value that is dependent of the stator resistance of the motor and the reference current in a f axis.

Thus, controlling the machine directly from the estimated flux and the measured currents of the motor. The control requires no prior knowledge on the position of the machine rotor, nor saturation conditions of the motor that vary with torque conditions.

According to a particular feature, the flux estimation module further comprises:

means for dividing the estimated flux $\hat{\lambda}_\beta$ in the $\beta$ axis by the estimated flux $\hat{\lambda}_\alpha$ in the $\alpha$ axis in order to provide an estimated tangent of the load angle $\hat{\delta}_s$.

Thus, the estimated load angle $\hat{\delta}_s$ can feed the DFVC controller and the speed estimator without the need of any position sensor.

The characteristics of the invention will emerge more clearly from a reading of the following description of example embodiments, the said description being produced with reference to the accompanying drawings.

DESCRIPTION OF EMBODIMENTS

Figure 1:
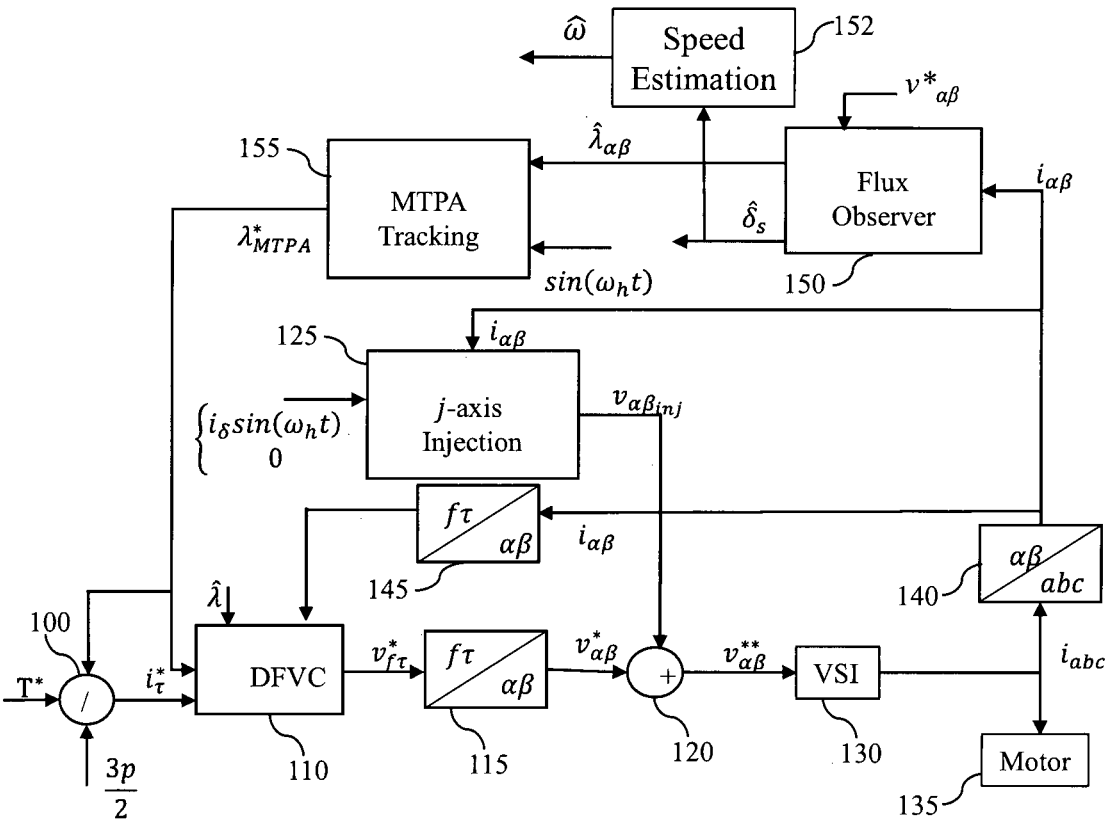
FIG. 1 represents a first example of a direct flux vector control of a motor using maximum torque per ampere according to the invention.

FIG. 1 represents a first example of a direct flux vector control of a motor using maximum torque per ampere according to the invention.

In the system shown in FIG. 1, the reference torque T* is fed to a divider 100 together with a reference flux $$\lambda^*_{MTPA}$$

provided by a MTPA tracking module 155 and 3/2 times the number of poles pairs of the motor 135 in order to obtain a reference current $$i^*_\tau$$

in a τ axis that is provided to a DFVC module 110.

$$i^*_\tau = \frac{2}{3p} \frac{T^*}{\lambda^*_{MTPA}}$$

The DFVC module 110, from the reference current $$i^*_\tau$$

in the τ axis, an estimated flux $\hat{\lambda}$ norm, a measured current $i_{f\tau}$ in a fτ framework and the reference flux $$\lambda^*_{MTPA}$$

from the MTPA tracking module 155, determines a reference voltage v*_{fτ} in the fτ framework.

The reference voltage v*_{fτ} in the fτ framework is provided to a framework transformation module 115 that transforms the reference voltage v*_{fτ} in the fτ framework into a reference voltage v*_{αβ} in the αβ framework using an estimated load angle $\hat{\delta}_s$.

The reference voltage v*_{αβ} in the αβ framework is provided to a summation module 120 that sums the reference voltage v*_{αβ} with high frequency injection voltage v_{αβ_{inj}} in the αβ framework in order to obtain a modified reference voltage v**_{αβ} in the αβ framework.

The modified reference voltage v_{αβ} in the αβ framework is provided to a voltage source inverter VSI 130 that is connected to the motor 135. The motor current vector i_{abc} measured in the three-phase abc is provided to a framework transformation module 140**.

The framework transformation module 140 transforms the motor current i_{abc} measured in the three-phase abc to a measured motor current vector i_{αβ} in the αβ framework.

The measured current motor vector i_{αβ} in the αβ framework is provided to a flux estimation module 150, a j-axis injection module 125 and to a framework transformation module 145.

The framework transformation module 145 transforms the measured current motor vector i_{αβ} in the αβ framework into a measured current motor vector i_{f\tau} the fτ framework using an estimated load angle $\hat{\delta}_s$.

The measured current vector i_{f\tau} in the fτ axis is provided to the DFVC module 110.

The j-axis injection module 125 determines the injection voltage v_{αβ_{inj}} in the αβ framework from the measured current motor vector i_{αβ} in the αβ framework and a high frequency sinewave signal i_δ sin(ω_h t).

The high frequency injection voltage (v_{αβ_{inj}}) is determined in order to provide a high frequency current response of the motor to the injected voltages that is perpendicular to the measured motor current vector.

The high frequency injection voltage (v_{αβ_{inj}}) is in a frequency range between 100 Hz—to the switching frequency of the voltage source inverter VSI 130.

The flux estimation module 150 determines, from the measured current motor vector i_{αβ} in the αβ framework and the voltage references v*_{αβ}, the estimated flux λ_{αβ} in the αβ framework and the estimated load angle $\hat{\delta}_s$.

The speed estimation module 152 determines the speed of the motor 135 from the estimated load angle.

For example, the speed $\hat{\omega}$ is estimated using a phase lock loop and a low pass filtering of the output of the phase lock loop.

The estimated flux $\hat{\lambda}_{αβ}$ in the αβ framework is provided to a MTPA tracking module 155 and to the DFVC module 110.

The MTPA tracking module 155 determines, from the estimated flux $\hat{\lambda}_{αβ}$ in the αβ framework and the high frequency sinewave signal sin(ω_h t), the reference flux $$\lambda^*_{MTPA}.$$

According to the invention, the system comprises:
means for determining by the direct flux vector control module reference voltages from an estimated flux ($\hat{\lambda}$) norm, a reference flux $$\lambda^*_{MTPA},$$

a measured current motor vector i_{f\tau} in a fτ framework using an estimated load angle $\hat{\delta}_s$ and a reference current $$(i^*_\tau)$$

in a τ axis that is obtained from a reference torque (T*) and the reference flux $$\lambda^*_{MTPA},$$

means for summing the reference voltages (v*$_{\alpha\beta}$) with a high frequency injection voltage (v$_{\alpha\beta_{inj}}$)

means for driving the motor with the summed voltages, means for measuring a motor current vector (i$_{\alpha\beta}$), means for determining the high frequency injection voltage (v$_{\alpha\beta_{inj}}$) from the measured motor current vector (i$_{\alpha\beta}$) and a high frequency sinewave signal (i$_\delta$ sin($\omega_h$t)), so that the high frequency current response of the motor to the high frequency voltage is perpendicular to the measured motor current vector, means for determining an estimated flux ($\hat{\lambda}_{\alpha\beta}$) from the measured motor currents (i$_{\alpha\beta}$) and the voltage references (v*$_{\alpha\beta}$), means for determining, by the maximum torque per ampere field module, from the estimated flux ($\hat{\lambda}_{\alpha\beta}$) and the high frequency sinewave signal (sin($\omega_h$t)), the reference flux $$(\lambda^*_{MTPA})$$

to be provided to the direct flux vector control module so that the high frequency flux response to the injected voltage is aligned with the measured current vector.

The torque is given by $T = i_{dq}^T J\lambda_{dq}$ where J is the matrix $$\begin{bmatrix} 0 & -1 \\ 1 & 0 \end{bmatrix},$$

i$_{dq}$ is the measured current in dq framework, T is the transpose and $\lambda_{dq}$ is the flux.

The MTPA law is met when $$\left.\frac{dT}{d\gamma}\right|_i = 0,$$

where $\gamma = \angle i_{dq}$ denotes the current shoot angle in the dq framework $$\left.\frac{dT}{d\gamma}\right|_i = \frac{3p}{2}\left(\frac{di_{dq}^T}{d\gamma}J\lambda_{dq} + i_{dq}^T J\frac{d\lambda_{dq}}{d\gamma}\right) = \left.\frac{dT}{d\gamma}\right|_i =$$

$$\frac{3p}{2}(JLi_{dq} - lJi_{dq})^T Ji_{dq} = \frac{3p}{2}(\lambda_{dq}{}^a)^T Ji_{dq}$$

Where l represents incremental inductances matrix and L represents the chord inductance matrix.

At MTPA, $(\lambda_{dq}{}^a)^T Ji_{dq} = 0$, the auxiliary flux $\lambda_{dq}{}^a = JLi_{dq} - lJi_{dq}$ is aligned with the measured current vector.

Expressed in the ij framework, where the i axis is aligned with i$_{dq}$, the derivative of the flux $\lambda_{ij} = e^{-J\gamma}Le^{J\gamma}i_{ij}$ expresses as a function of auxiliary flux is:

$$d\lambda_{ij} = e^{-J\gamma}le^{J\gamma}di_{ij} - \lambda_{ij}{}^a d\gamma$$

Under assumption of constant current amplitude (di$_{ij}$=0), differential equation derates as d$\lambda_{ij}$=−$\lambda_{ij}{}^a$dγ.

As the MTPA condition is then met $\lambda_j{}^a$=0, it is therefore met when d$\lambda_j$=0.

The invention thus consists in injecting a small HF current excitation in the j axis in order to meet di$_{ij}$=0 and to obtain a zero HF flux response in that axis d$\lambda_j$=0. Achieving this, $\lambda_j{}^a$=0, the flux perturbation vector is therefore aligned with current vector, and MTPA condition is met.

In a variant, once the MTPA law is obtained, the high frequency injection is turned off. The flux is then adapted to torque conditions according to the just obtained MTPA law.

In yet another variant, the injection can be turned on sporadically to evaluate any change of the machine over time and reset the MTPA law.

Figure 2:
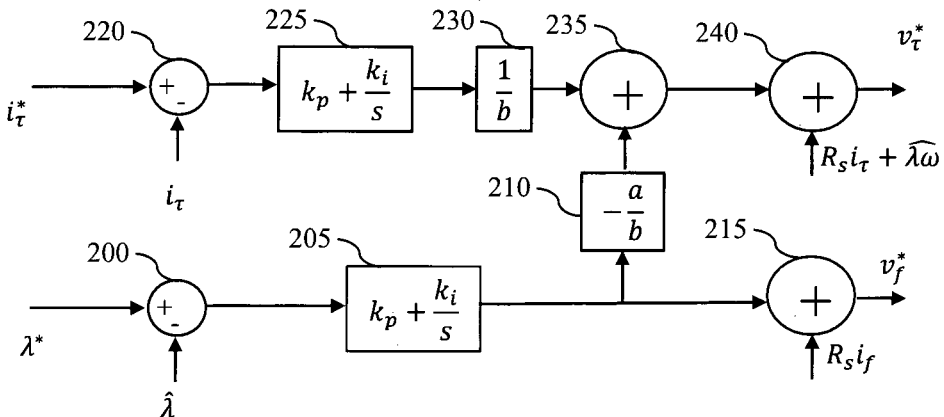
FIG. 2 represents an example of a block diagram of a direct flux vector control module according to the present invention.

FIG. 2 represents an example of a block diagram of a direct flux vector control module according to the present invention.

The direct flux vector control module 110 comprises a subtracting module 220 that subtracts from the reference current $$i^*_\tau$$

in the τ axis, the measured current i$_\tau$ in the τ axis.

The output of the subtracting module 220 is provided to a PI regulator 225 the output of which is provided to a multiplication module 230 that multiplies the output of the PI regulator 225 by a decoupling constant value 1/b.

The direct flux vector control module 110 comprises a subtracting module 200 that subtracts from the reference flux $$\lambda^*_{MTPA},$$

the estimated flux norm $$\hat{\lambda} = \sqrt{\hat{\lambda}_\alpha^2 + \hat{\lambda}_\beta^2}.$$

The output of the subtracting module 200 is provided to a PI regulator 205 the output of which is provided to a multiplication module 210 that multiplies the output of the PI regulator 205 by a decoupling constant value −a/b that are calibrated from the motor nameplate ratings. As example, values for a and b are a=4 and b=13.

The outputs of the multiplication modules 230 and 210 are summed by a summation module 235.

The output of the summation module 235 is provided to a summation module 240 that sums the result of the summation performed by the summation module 235 to R$_s$i$_\tau$+$\hat{\lambda}\hat{\omega}$ in order to provide the reference voltage v*$_\tau$ in the τ axis, where R$_s$ is the stator resistance, and $\hat{\omega}$ is the estimated motor speed.

The Stator resistance R$_s$ is for example obtained from a self-commissioning procedure. The motor speed is estimated tracking the load angle $\hat{\delta}_s$ of the estimated flux vector.

The output of the PI regulator 205 is provided to a summation module 215 that sums the result of the output of the PI regulator 205 to R$_s$i$_f$ in order to provide the reference voltage v*$_f$ in the f axis.

Figure 3:
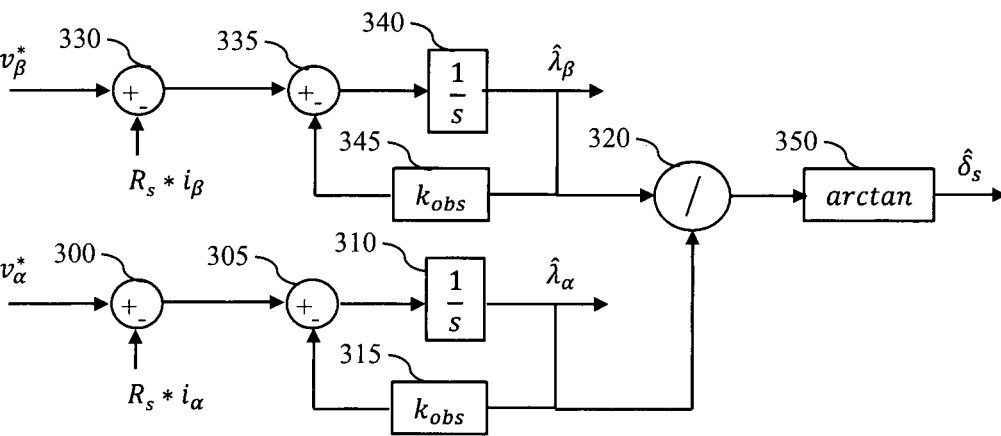
FIG. 3 represents an example of a block diagram of a flux estimation module according to the present invention.

FIG. 3 represents an example of a block diagram of a flux estimation module according to the present invention.

The flux estimation module 150 comprises a subtracting module 300 that subtracts from the reference voltage v*$_a$ in the α axis the current i$_a$ in the α axis multiplied by the resistance R$_s$.

The result of the subtracting module 300 is provided to a subtracting module 305.

The subtracting module 305 subtracts from the result of the subtracting module 300 a result provided by a multiplication module 315.

The output of the subtracting module 305 is provided to an integrator 310 in order to provide the estimated flux $\hat{\lambda}_\alpha$ in the α axis.

The estimated flux $\hat{\lambda}_\alpha$ in the α axis is provided to a divider 320 and to the multiplication module 315 that multiplies the estimated flux $\hat{\lambda}_\alpha$ in the α axis by a coefficient k$_{obs}$ that is an observation gain.

The flux estimation module 150 comprises a subtracting module 330 that subtracts from the reference voltage v*$_β$ in the β axis the current i$_β$ in the β axis multiplied by the resistance R$_s$ of the motor 135.

The result of the subtracting module 330 is provided to a subtracting module 335.

The subtracting module 335 subtracts from the result of the subtracting module 330 a result provided by a multiplication module 345.

The output of the subtracting module 335 is provided to an integrator 340 in order to provide the estimated flux $\hat{\lambda}_β$ in the β axis.

The estimated flux $\hat{\lambda}_β$ in the β axis is provided to the divider 320 and to the multiplication module 345 that multiplies the estimated flux $\hat{\lambda}_β$ in the β axis by the coefficient k$_{obs}$.

The division module 320 divides the estimated flux $\hat{\lambda}_β$ in the β axis by the estimated flux $\hat{\lambda}_\alpha$ in the α axis.

The result of the division module 320 is transformed by arctangent by the module 350 in order to provide the estimated load angle $\hat{\delta}_s$.

Figure 4:
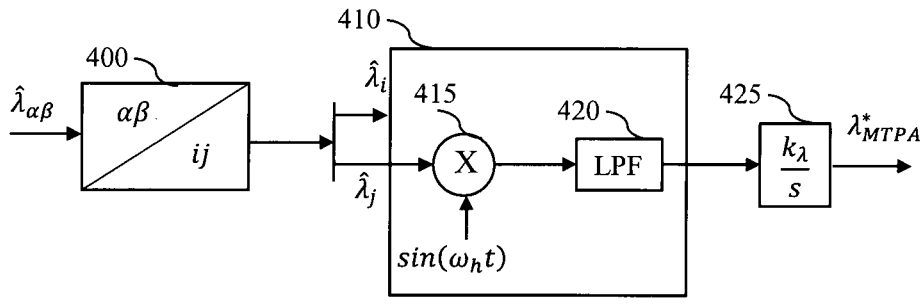
FIG. 4 represents an example of a block diagram of a maximum torque per ampere module according to the present invention.

FIG. 4 represents an example of a block diagram of a maximum torque per ampere module according to the present invention.

The maximum torque per ampere module 155 comprises a framework transformation module 400 that transforms the estimated flux $\hat{\lambda}_{\alpha β}$ in the αβ framework into an estimated flux $\hat{\lambda}_{ij}$ in the ij framework using a measured angle γ$_s$ between the measured currents and the α axis of αβ framework.

The estimated flux $\hat{\lambda}_j$ in the j axis is provided to multiplier 415 that multiplies the estimated flux $\hat{\lambda}_j$ in the j axis by the high frequency sinewave signal sin(ω$_h$t).

The output of the multiplication module 415 is processed by a low pass filter 420.

Modules 415 and 420 form a heterodyne demodulation 410.

The output of the heterodyne modulation 410 is provided to a PI regulator 425 with an integral gain of k$_\lambda$ and proportional gain zero in order to provide the reference flux $$\lambda^*_{MTPA}.$$

The reference flux $$\lambda^*_{MTPA}$$

is thus controlled to ensure that the flux response to the high frequency injection voltage is null on the j axis, and thus only located on the i axis. The high frequency flux response to the injected voltage is aligned with the measured current vector.

Figure 5:
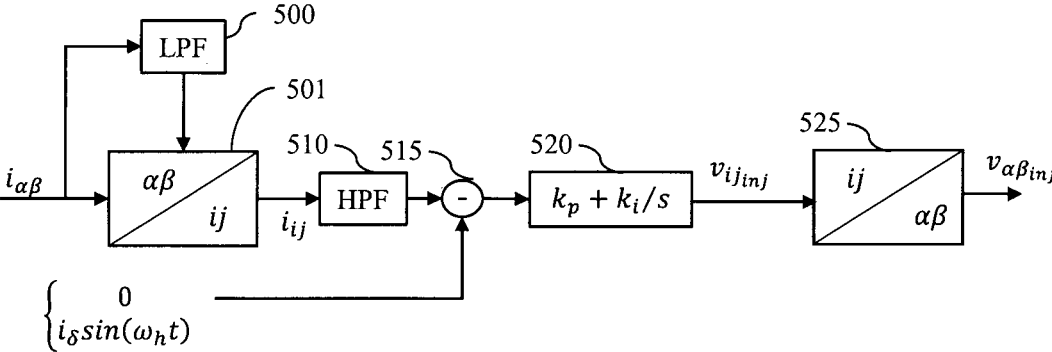
FIG. 5 represents an example of a block diagram of an injection block module according to the present invention.

FIG. 5 represents an example of a block diagram of an injection block module according to the present invention.

The injection module 125 comprises means 500 for determining a fundamental current vector i$_{\alpha β\_LF}$. As example, the fundamental current vector i$_{\alpha β\_LF}$ is determined by low-pass filtering of the measured current vector i$_{\alpha β}$. As another example, the fundamental current vector i$_{\alpha β\_LF}$ is a past memorised current vector.

The injection module 125 comprises a framework transformation module 501 that transforms the measured current motor vector i$_{\alpha β}$ in the αβ framework into a measured current motor vector i$_{ij}$ in a ij framework. The ij framework is rotated from the αβ framework using an angle γ$_s$ that is derived from the determined fundamental current vector $$\gamma_s = \arctan\left(\frac{i_{β\_LF}}{i_{\alpha\_LF}}\right).$$

The output of the framework transformation module 501 is provided to a high pass filter HPF 510. The output of the high pass filter 510 is provided to a subtracting module 515 that subtracts the high frequency sinewave signal i$_δ$ sin(ω$_h$t) in the j axis to the output of the high pass filter 510.

The output of the subtracting module 515 is provided to a PI regulator 520 in order to obtain a voltage injection signal in the ij framework. The voltage injection signal in the ij framework is provided to a framework transformation module 525 that transforms the voltage injection signal in the ij framework into the voltage injection signal v$_{\alpha β_{inj}}$ in the αβ framework.

The high frequency current response to the high frequency injection voltage is thus controlled to follow the reference that is located only in the j axis. The high frequency current response of the motor to the high frequency injection voltage is perpendicular to the measured motor current vector.

Figure 6:
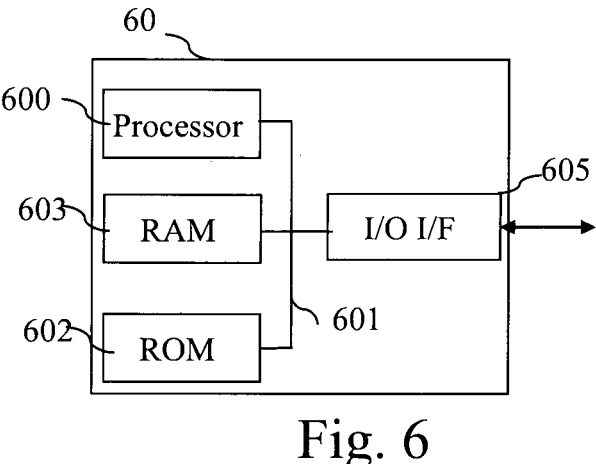
FIG. 6 represents a second example of a direct flux vector control of a motor using maximum torque per ampere according to the invention.

FIG. 6 represents a second example of a direct flux vector control of a motor using maximum torque per ampere according to the invention.

Figure 8:
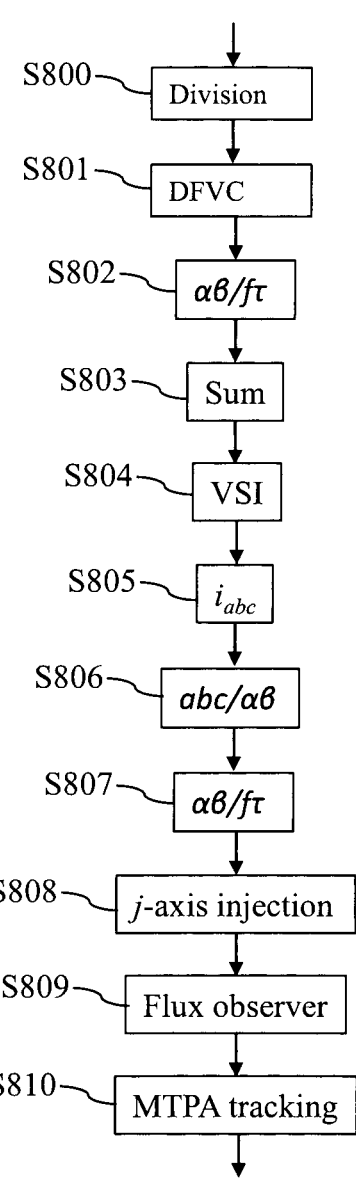
FIG. 8 represents an example of an algorithm for controlling a motor according to the invention.

The direct flux vector control of a motor device 60 using maximum torque per ampere has, for example, an architecture based on components connected by a bus 601 and a processor 600 controlled by a program as disclosed in FIG. 8.

The bus 601 links the processor 600 to a read only memory ROM 602, a random access memory RAM 603, an input output I/O IF interface 605.

The input output I/O IF interface 605 enables the device for monitoring the condition of a motor 135 to sense signals representative of current flowing through the motor 135.

The memory 603 contains registers intended to receive variables and the instructions of the program related to the algorithm as disclosed in FIG. 8.

The read-only memory, or possibly a Flash memory 602, contains instructions of the programs related to the algorithm as disclosed in FIG. 8, that are when the device 60 is powered on, loaded to the random-access memory 603. Alternatively, the program may also be executed directly from the ROM memory 602.

The calculation performed by the device 60 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the device 60 includes circuitry, or a device including circuitry, causing the device 60 to perform the program related to the algorithm as disclosed in FIG. 8.

Figure 7:
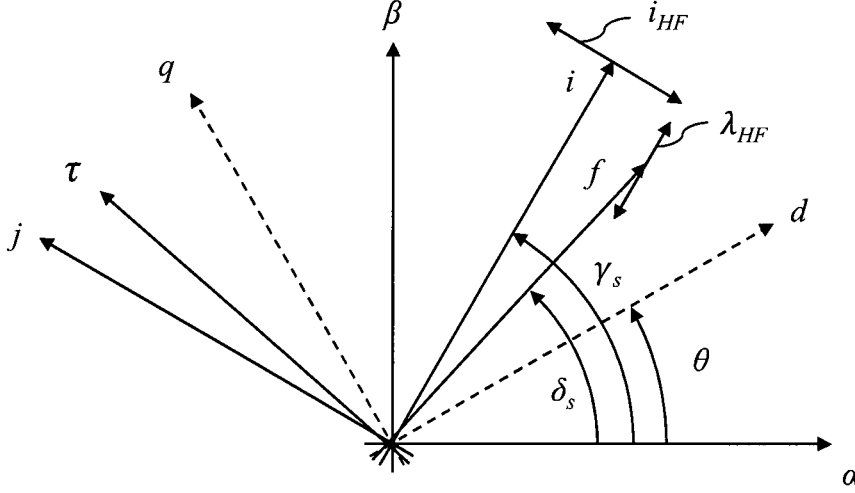
FIG. 7 represents the motor frameworks used by the present invention.

FIG. 7 represents the motor frameworks used by the present invention.

In FIG. 7, $\alpha\beta$ two-phase stator framework is represented. The $\alpha\beta$ framework is static in reference to the stator of the motor.

The dq two-phase rotor framework is represented. The dq framework is dynamic and follows the rotor position $\theta$.

The ij two-phase current framework is represented. The i axis follows the current vector, forming an angle $\gamma_s$ with the $\alpha$ axis, while the j axis is perpendicular to the current vector.

The f$\tau$ two-phase flux framework is represented. The f axis follows the estimated flux vector, forming an angle $\delta_s$ with the $\alpha$ axis, while the $\tau$ axis is perpendicular to the estimated flux vector.

The HF current response $i_{HF}$ to the high frequency voltage injection is represented. The HF current response $i_{HF}$ is perpendicular to the i axis, thus perpendicular to the measured current vector.

The HF response $\lambda_{HF}$ of the estimated flux to the high frequency injection voltage is represented. The HF response $\lambda_{HF}$ is aligned with the i axis, thus aligned with the measured current vector. The j axis flux is constant.

FIG. 8 represents an example of an algorithm for controlling a motor according to the invention.

The present algorithm is disclosed in an example wherein it is executed by the processor 600 of the direct flux vector control of a motor device 60.

At step S800, the processor 600 determines a reference current $$i_\tau^*$$

in a $\tau$ axis using the reference torque T* together with a reference flux $$\lambda_{MTPA}^*$$

and 3/2 times the number of poles pairs of the motor 135 as:

$$i_\tau^* = \frac{2}{3p} \frac{T^*}{\lambda_{MTPA}^*}.$$

At step S801, the processor 600 performs the Direct Flux Vector Control DFVC, from the reference current $$i_\tau^*$$

in the $\tau$ axis, an estimated flux $\hat{\lambda}$ norm, a measured current $i_{f\tau}$ in a f$\tau$ framework and the reference flux $$\lambda_{MTPA}^*.$$

The processor 600 determines a reference voltage $v^*_{f\tau}$ in the f$\tau$ framework.

At step S802, the processor 600 transforms the reference voltage $v^*_{f\tau}$ in the f$\tau$ framework into a reference voltage $v'_{\alpha\beta}$ in the $\alpha\beta$ framework using an estimated load angle $\hat{\delta}_s$.

At step S803, the processor 600 sums the reference voltage $v'_{\alpha\beta}$ in the $\alpha\beta$ framework with an injection voltage $v_{\alpha\beta_{inj}}$ in the $\alpha\beta$ framework in order to obtain a modified reference voltage $v^{**}_{\alpha\beta}$ in the $\alpha\beta$ framework.

At step S804, the processor 600 provides the modified reference voltage $v^{}_{\alpha\beta}$ in the $\alpha\beta$ framework to a voltage source inverter VSI that is connected to the motor 135**.

At step S805, the processor 600 measures the motor current vector $i_{abc}$ in the three-phase abc.

At step S806, the processor 600 transforms the motor current vector $i_{abc}$ measured in the three-phase abc in a measured current motor vector $i_{\alpha\beta}$ in the $\alpha\beta$ framework.

At step S807, the processor 600 transforms the measured current motor vector $i_{\alpha\beta}$ in the $\alpha\beta$ framework into a measured current motor vector $i_{f\tau}$ the f$\tau$ framework.

At step S808, the processor 600 determines the injection voltage $v_{\alpha\beta_{inj}}$ in the $\alpha\beta$ framework from the measured current motor vector $i_{\alpha\beta}$ in the $\alpha\beta$ framework and a high frequency sinewave signal $i_\delta \sin(\omega_h t)$. The injection voltage is determined to drive the high frequency of the current to be perpendicular to the measured current vector.

At step S809, the processor 600 determines, from the measured current vector $i_{\alpha\beta}$ in the $\alpha\beta$ framework and the voltage references $v^*_{\alpha\beta}$, the estimated flux $\lambda_{\alpha\beta}$ in the $\alpha\beta$ framework and the estimated load angle $\hat{\delta}_s$.

At step S810, the processor 600 determines, from the estimated flux $\hat{\lambda}_{\alpha\beta}$ in the $\alpha\beta$ framework and the high frequency sinewave signal $\sin(\omega_h t)$, the reference flux $$\lambda_{MTPA}^*.$$

The reference flux is determined to drive the high frequency response of the flux to be aligned with the measured current vector.

Naturally, many modifications can be made to the embodiments of the invention described above without departing from the scope of the present invention.

The invention claimed is:

1. A method for controlling a motor using a maximum torque per ampere field module and a direct flux vector control module, characterized in that the method comprises:

determining by the direct flux vector control module reference voltages in a f$\tau$ framework from an estimated flux norm, a reference flux, a measured current motor vector in a f$\tau$ framework using an estimated load angle and a reference current in a t axis that is obtained from a reference torque and the reference flux, summing the reference voltages transformed in a stator $\alpha\beta$ framework with a high frequency injection voltage, driving the motor with the summed voltages, measuring a motor current vector, determining the high frequency injection voltage from the measured motor current vector and a high frequency sinewave signal, so that the high frequency current response of the motor to the high frequency injection voltages is perpendicular to the measured motor current vector, determining an estimated flux from the measured motor currents and the voltage references, determining, by the maximum torque per ampere field module, from the estimated flux and the high frequency sinewave signal, the reference flux to be provided to the direct flux vector control module so that the high frequency flux response to the injected voltage is aligned with the measured current vector.

2. A device for controlling a three-phase motor using a maximum torque per ampere field module and a direct flux vector control module, characterized in that the device comprises circuitry for:

determining by the direct flux vector control module reference voltages in a fτ framework from an estimated flux norm, a reference flux, a measured current motor vector in a fτ framework using an estimated load angle and a reference current in a t axis that is obtained from a reference torque and the reference flux, summing the reference voltages transformed in a stator αβ framework with a high frequency injection voltage, driving the motor with the summed voltages, measuring a motor current vector, determining the high frequency injection voltage from the measured motor current vector and a high frequency sinewave signal, so that the high frequency current response of the motor to the high frequency voltage is perpendicular to the measured motor current vector, determining an estimated flux from the measured motor currents and the voltage references, determining, by the maximum torque per ampere field module, from the estimated flux and the high frequency sinewave signal, the reference flux to be provided to the direct flux vector control module so that the high frequency flux response to the injected voltage is aligned with the measured current vector.

3. The device according to claim 2, characterized in that the circuitry for determining the high frequency injection voltage comprises circuitry for:

determining a fundamental current vector, transforming the current vector measured in the stator framework into a current vector in a current framework aligned with the determined fundamental current vector, determining a filtered current vector by high frequency filtering of the current vector, subtracting a high frequency sinewave signal in the j axis of the current framework to the filtered current vector and for performing a proportional integral regulation in order to obtain a voltage injection signal in the current framework, transforming the voltage injection signal in the current framework into the high frequency voltage in the stator framework.

4. The device according to claim 2, characterized in that the maximum torque per ampere module comprises circuitry for:

performing a heterodyne modulation of the estimated flux in a j axis and for performing a proportional integral regulation of the heterodyne demodulation result in order to provide the reference flux.

5. The device according to claim 2, characterized in that the direct flux vector control module comprises circuitry for:

subtracting from the reference current in the t axis, the measured current $i_\tau$ in the t axis and performing a first proportional integral regulation of the result of the subtraction, subtracting from the reference flux, the estimated flux norm, and performing a second proportional integral regulation of the result of the subtraction, executing a first summing of the results of the proportional integral regulations, summing the result of the first summing by a first value that is dependent of a stator resistance of the motor, an estimated motor speed and the reference current in the τ axis, executing a second summing of the result of the second proportional integral regulation to a second value that is dependent of the stator resistance of the motor and the reference current in a f axis.

6. The device according to claim 2, characterized in that the circuitry for determining the estimated flux comprise circuitry for:

subtracting from a reference voltage in a α axis the motor currents in the α axis multiplied by the stator resistance, subtracting from the result of the subtracting of the reference voltage in the α axis of the current in the α axis multiplied by the stator resistance an estimated flux in the α axis by a coefficient and performing a third proportional integral regulation of the result of the subtraction in order to obtain the estimated flux in the α axis, subtracting from a reference voltage in the β axis the current in the β axis multiplied by the stator resistance, subtracting from the result of the subtraction of the reference voltage in the β axis of the current in the β axis multiplied by the stator resistance an estimated flux in the β axis by the coefficient and performing a fourth proportional integral regulation of the result of the subtraction in order to obtain the estimated flux in the β axis.

7. The device according to claim 6, characterized in that the flux estimation module further comprises circuitry for:

dividing the estimated flux in the β axis by the estimated flux in the α axis in order to provide an estimated tangent of the load angle.

* * * * *